E. Sullivan,
Piston Packing.
No. 96,284.    Patented Oct. 26, 1869.
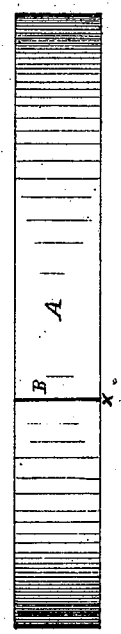
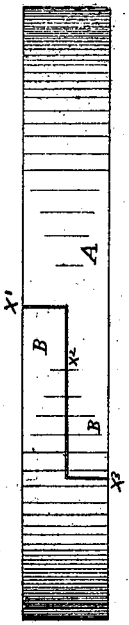
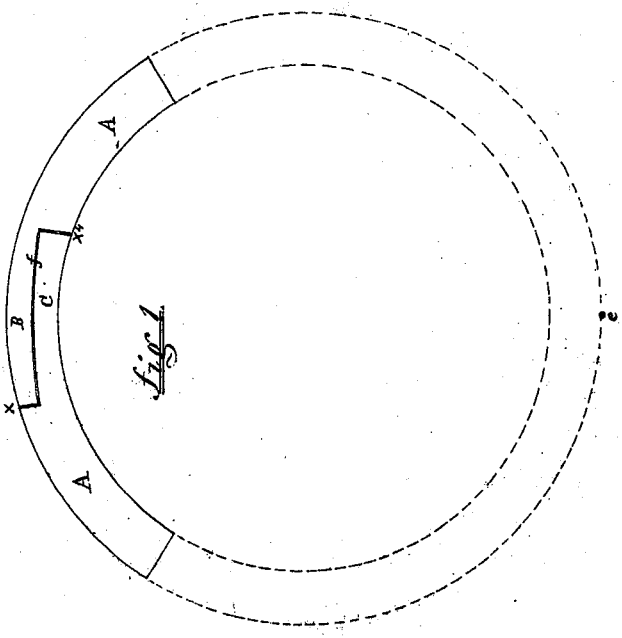
Attest:
A. C. Johnston
W. Johnston
Edward Sullivan
By his attorney J. J. Johnston

United States Patent Office.

EDWARD SULLIVAN, OF PITTSBURG, PENNSYLVANIA.

Letters Patent No. 96,284, dated October 26, 1869.

IMPROVEMENT IN STEAM-ENGINE-PISTON PACKING.

The Schedule referred to in these Letters Patent and making part of the same.

*To all whom it may concern:*

Be it known that I, EDWARD SULLIVAN, of Pittsburg, in the county of Allegheny, and State of Pennsylvania, have invented a new and useful Improvement in "Packing for Pistons" of Steam-Engines, the same being an improvement on the piston-packing for which Letters Patent of the United States were granted to me, and bearing date, April 9, 1867; and I do hereby declare that the following is a full, clear, and exact description of my present invention, reference being had to the accompanying drawings, and to the letters of reference marked thereon.

The nature of my invention consists in the construction of the laps and joints of metallic packing-rings of "piston-packing," so that said laps and joints shall be formed in the said rings, in the manner hereinafter described.

To enable others skilled in the art to make and use my invention, I will proceed to describe its construction and operation.

In the accompanying drawings, which form part of my specification—

Figure 1 is an edge view of a section of my improved metallic packing-rings.

Figures 2 and 3 are top views of the same, and represent different forms of joints between the laps.

In the drawings—

A represents the metallic packing-ring, which is provided with laps, B and C, which laps are arranged, with relation to each other, so that the lines of separation between them shall be as indicated at $x$ $f$ and $x^4$ of fig. 1; or, as indicated at $x$ in fig. 2; or, as indicated at $x^1$, $x^2$, and $x^3$, in fig. 3; the line $f$ remaining the same, as shown in fig. 1.

The manner of marking out the line $f$ is as follows:

I take a pair of compasses, and set one point of them at the point marked $e$ in fig. 1, and, with the other point, mark out the line $f$. The other lines, $x$, $x^1$, $x^2$, $x^3$, and $x^4$, of separation, and the means used for making said lines and divisions between the laps B and C, I leave to the judgment of the skilled mechanic.

The object of making the laps B and C, and separating them, in the manner herein described, is to prevent the steam from leaking through at the point or points of separation in "metallic expansion packing-rings."

The advantage of making the lines of separation between the laps B and C will be apparent to one skilled in construction.

Having thus described the nature, construction, and operation of my improvement,

What I claim, as of my invention, is—

Providing the packing-ring A with the laps C and B, said ring and laps being constructed and arranged substantially as herein described.

EDWARD SULLIVAN.

Witnesses:
H. H. BLAKE,
T. HOLLAND.